Figure 1:
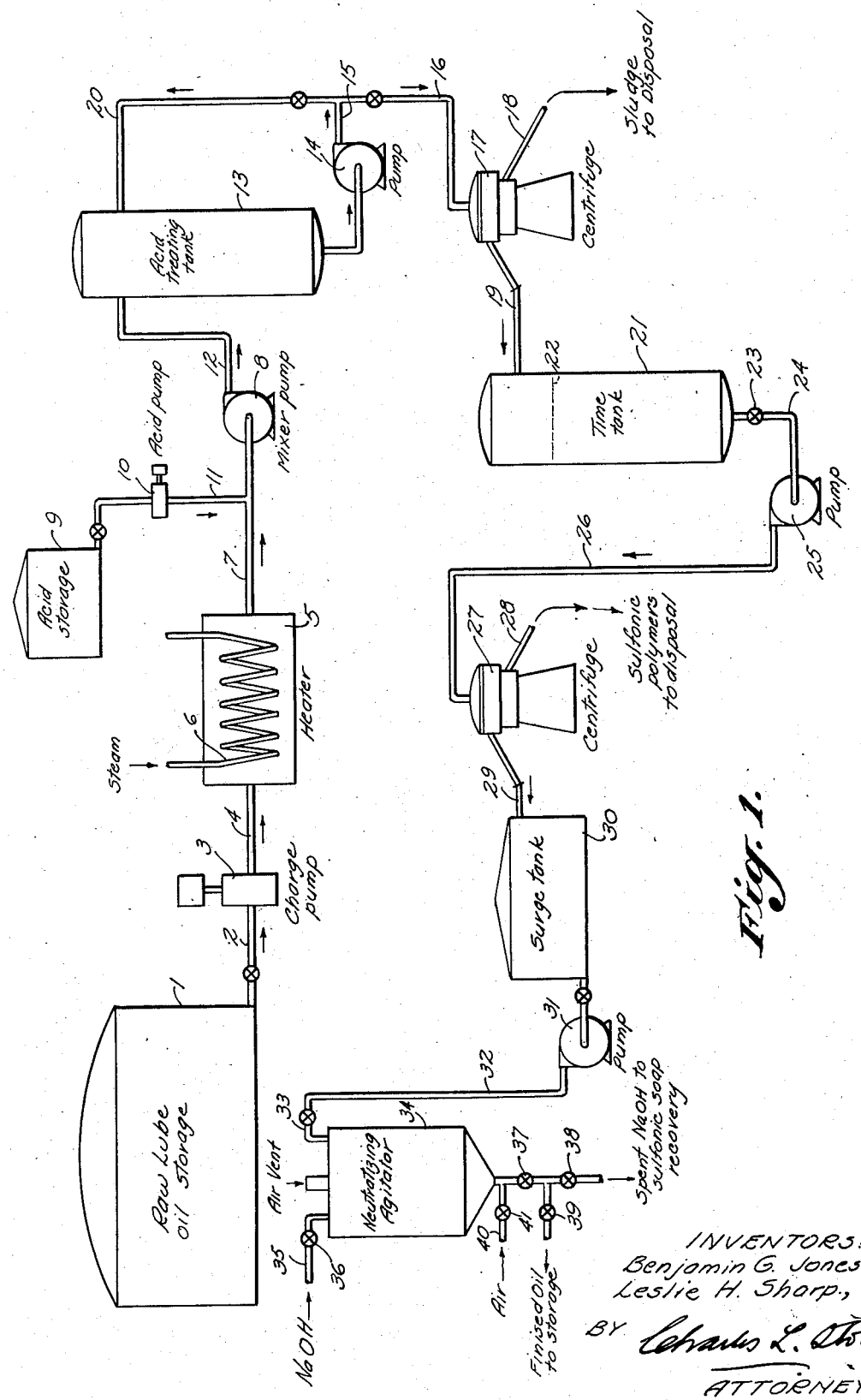

INVENTORS:
Benjamin G. Jones,
Leslie H. Sharp,
BY Charles L. Stotes
ATTORNEY

Patented May 14, 1946

2,400,298

UNITED STATES PATENT OFFICE 2,400,298

METHOD OF ACID TREATING A VISCOUS HYDROCARBON OIL

Benjamin G. Jones, Associated, and Leslie H. Sharp, Martinez, Calif., assignors to Tide Water Associated Oil Company, San Francisco, Calif., a corporation of Delaware Application February 12, 1944, Serial No. 522,078

11 Claims. (Cl. 196—40)

This invention relates to use the sulphuric acid treatment of lubricating oil and similar viscous oils and to the subsequent removal therefrom of the spent acid and other reaction products. It has for its principal object the separation of reaction products from acid treated viscous oil stocks in a highly efficient manner.

Another object is to reduce the quantity of acid reaction products normally contained in sulphuric acid treated lubricating stocks prior to neutralization and thereby reduce the quantity of alkali needed for neutralization and to improve the overall efficiency of the neutralizing procedure.

A further object is to improve the quality of sulphonic acids derived from acid treated lubricating oils.

Other objects will be apparent from the following description.

In the manufacture of lubricating oils it is common practice to contact lubricating stocks with sulphuric acid (of a strength from about 66° Bé. up to and including fuming acid), generally at slightly elevated temperatures, for sufficient time to permit the acid to react with the more reactive constituents of the oil after which the spent acid, or acid sludge, is removed and the oil is then neutralized with an alkali and subjected to whatever further finishing treatment may be desired, such as redistillation, contact with filtering media, etc.

For decades such treatment was carried out by "batch" operation, usually in open vessels and with air-agitation, following which the sludge was permitted to settle by gravity, usually with the addition of a small amount of water to hasten the coagulation and settling of the sludge. Such practice was tedious, messy, and wasteful of both time and materials. In modern practice the oil is agitated with the acid in efficient mechanical devices following which the sludge is separated by centrifuge; however, the neutralization is generally carried out by batch operation because of the careful attention required of the operator to avoid excessive emulsions which tend to occur at this stage of the process as a result of the formation of soaps of the oil-soluble sulphonic acids. It is to this practice of separating the sludge with centrifuges that the present invention is more particularly related.

After treatment with sulphuric acid and before centrifuging the oil-acid mixture will contain various acidic substances which, for the purposes of the present description, may roughly be classified as follows:

(1) Organic acids originally present in the oil, such as naphthenic acids, cresylic acids and phenols. Most of these are probably reacted with the sulphuric acid and, therefore, are present in the form of their sulphonic derivatives.

(2) Oil-soluble sulpho-acids of various types. For convenience these will be referred to as sulphonic acids.

(3) Suspended, oil-insoluble, sulpho-acids together with unreacted sulphuric acid. These will be referred to as sludge.

(4) Dissolved sulphur dioxide.

The centrifuging removes the sludge acidity described under item (3) above and it is the purpose of the subsequent neutralization to remove the remaining acidity. The resulting soaps of the oil-soluble sulphonic acids are advantageously recovered and become an important by-product. However, these soaps are powerful emulsifying agents and their presence during the neutralizing steps causes, at times, great difficulties in separating the same from the oil. As a result there is usually a substantial amount of oil which is removed with these soaps representing a loss in yield of finished lubricating oil.

The invention provides a means whereby the more unstable of the oil-soluble sulphonic acids may be removed from the oil prior to neutralization, thereby greatly reducing the amount of alkali expended in neutralization, markedly improving the quality of the sulphonic soap by-product produced by eliminating the more unstable elements, and, as the soaps of the more unstable acids appear to be the greatest emulsion producers during neutralization, greatly alleviating the emulsion troubles as well as producing greater yields of finished lubricating oil and less contamination of the sulphonic soap product by the oil. Further, it has been found that the more unstable of the sulphonic acids are the more corrosive and their presence during neutralization in iron vessels results in undesired iron contamination of the sulphonic soap by-product. This contamination is reduced by removing these acids prior to neutralization as provided for by the invention.

Briefly the invention comprises providing a time interval, after centrifuging the acid sludge from the acid treated oil, for the more unstable oil-soluble sulphonic acids to polymerize and become oil-insoluble and subsequently recentrifuging to remove the insoluble material so formed. It has been found that the oil-soluble sulphonic acids remaining in the oil after complete separation of sludge are of two kinds: (a) those which are relatively stable and (b) those which, though originally oil-soluble, polymerize in time to form oil-insoluble sludge-like matter suspended in the oil in finely divided form. Under temperature conditions normally occurring at this stage of the treatment (i. e. between about 80° and 160° F.), this polymerizing reaction appears to begin as soon as the sludge is separated from the oil and continues for about 45 minutes after which further polymerization is so slow as to be relatively unimportant. Accordingly, for best results, a time interval of at least about 45 minutes should be given to permit as great a quantity as possible of these unstable compounds to polymerize; however, with a time interval of as low as ten minutes a noticeable degree of polymerization occurs which may be sufficient, under some circumstances, to reduce the amount of unstable oil-soluble sulphonic acids in a desirable degree.

As the quantity of sludge-like matter formed by the polymerizing reaction is only minor as compared with the quantity of acid sludge produced by the original acid treatment of the oil, the throughput rate of the centrifuge during the recentrifuging step may be maintained considerably higher than that required for efficient separation of sludge in the first centrifuging step, or, if desired, fewer or smaller centrifuges may be used for the second separation.

In carrying out the invention it may be convenient to pass the oil, after removal of sludge in the first centrifuging operation, to a storage tank wherein sufficient time is allowed for the polymerizing reaction, and then, at intervals, to discontinue the acid contacting operations and to recentrifuge the oil from the storage tank in the same centrifuge that was used for the removal of the primary sludge. It is preferable, however, to provide two centrifuges, or sets of centrifuges, with a time-tank of sufficient size so that the oil may continuously be passed from the first centrifuge to the time-tank and continuously withdrawn from the time-tank and charged to the second centrifuge.

The invention may better be understood by reference to the drawings, Fig. 1 of which illustrates in diagrammatic form a typical sulphuric acid treating plant with additions suitable for practicing the invention. Raw distillate to be treated is charged by pump 3 from storage tank 1 and line 2 through line 4 and through heater 5 provided with suitable heating means, indicated by steam-coil 6, to raise the temperature of the oil to the desired degree for treatment. Commonly, temperatures of about 80° F. to 160° F. are employed, although, in various instances, higher or lower temperatures may be employed depending on the stocks treated and the degree of treatment desired. The heated oil leaves heater 5 through line 7 and passes to mixer 8 which may advantageously be a centrifugal pump. Sulphuric acid from storage tank 9 is charged by pump 10, at the desired rate for the required treatment, through line 11 and injected into the oil in line 7. The mixture of acid and oil is thoroughly mixed by mixer 8 and charged through line 12 to treating tank 13 which is of sufficient size to permit a desired time of contact (generally from 10 to 60 minutes) between the acid and oil. After sufficient contact in tank 13 the oil passes to pump 14 which charges the oil to centrifuge 17 through lines 15 and 16. In centrifuge 17 the oil is rapidly separated from the acid sludge, the oil leaving through line 19 and the sludge through line 18.

As described thus far the process is conventional and the oil leaving centrifuge 17 is conventionally passed directly to the neutralizing step and thence to whatever further finishing is desired. The various apparatus mentioned, not being a part of the present invention, may be varied. For example, mixer 8 may be of various forms such as an orifice mixer, or it may take the form of agitating devices placed in tank 13. Likewise, tank 13 may contain baffles, or the like, to assist in contacting the acid and oil. A convenient means for maintaining contact of the acid and oil is to circulate a portion of the oil from the bottom to the top of tank 13 through pump 14 and lines 15 and 20. Various rates of acid and oil may be used and the time of contact may be varied. Treating of the type here involved is usually conducted at an acid rate of about 20 to 100 pounds of acid per barrel of oil and a time of from 10 minutes to 1 hour is usually employed.

According to the invention the oil leaving centrifuge 17 flows through line 19 into a time-tank 21 wherein a level of oil 22 is maintained (by regulation of valve 23) at a sufficient height to cause the oil to remain in the time-tank a sufficient time, in excess of 10 minutes and preferably at least 45 minutes, for the least stable of the oil-soluble sulphonic reaction products to polymerize. After the required time in time-tank 21 the oil leaves through line 24 and is charged by pump 25, through line 26, to centrifuge 27 wherein the polymerized sulphonic products are separated and ejected through line 28, the purified oil leaving through line 29.

The treated oil leaving centrifuge 27 through line 29 is subsequently subjected to neutralization with alkali, preferably an aqueous solution of caustic soda. As stated prior, the neutralizing step is preferably carried out in batch operation and to permit the same a suitable surge tank 30 is provided. As illustrated in the drawings, oil is withdrawn in batches from surge tank 30 by pump 31 and charged through lines 32 and 33 to agitator 34 which is equipped with suitable means for agitation, indicated as agitation with air entering through line 40 controlled by valve 41. A required amount of caustic soda or other alkali is introduced through line 35 and valve 36 and, with sufficient agitation, the alkali combines with the various acids present in the oil, including sulphonic acids, forming an aqueous solution of the alkali salts of the acids. After proper agitation the mixture of oil and alkali is permitted to settle following which the spent alkali is withdrawn through valves 37 and 38, following which the treated oil is withdrawn through valves 37 and 39. The treated oil may be subjected, if desired, to further processing such as clay treatment or redistillation. The spent alkali may, if desired, be processed according to known methods for the recovery of sulphonic soaps.

The neutralizing procedure is more or less conventional and, in general, is similar to that conventionally applied to oil leaving centrifuge 17. Accordingly, the neutralizing may be varied without departing from the spirit of the invention. It is to be noted, however, that when the process of the invention is employed the separation of the aqueous mixture of alkali salts from the oil takes place more rapidly and more completely with a less tendency to form emulsions, and, accordingly, less oil is retained by the spent alkali resulting in greater yields of finished oil and less contamination by oil of recovered sulphonic soaps. Likewise, when the invention is practiced, due to the presence of less acidity in the oil, a less amount of alkali is required for neutralization.

Figure 2:
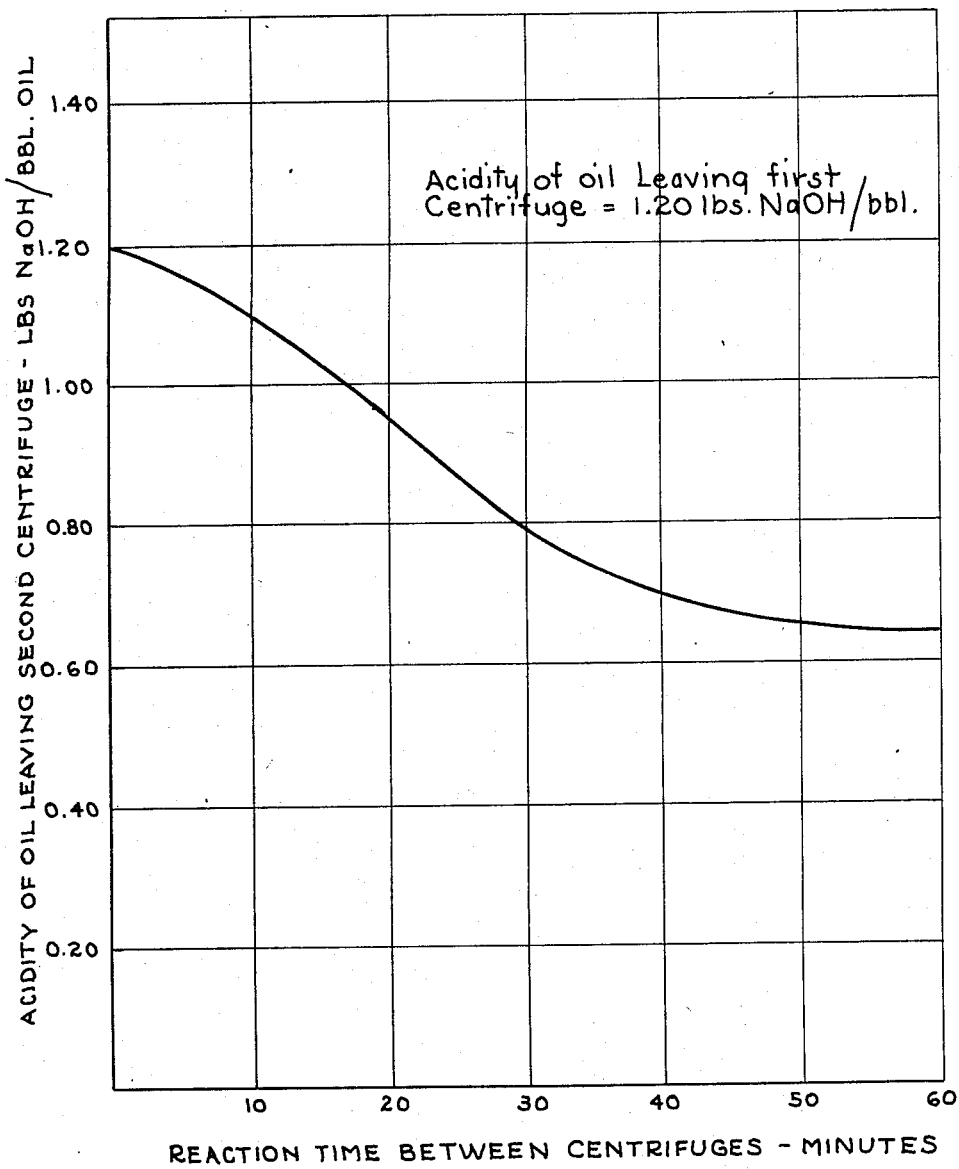

Fig. 2 of the drawings is a chart illustrating, for a specific treatment of a specific oil, the amount of acidity remaining in the oil after the second centrifuging for various reaction times between the primary centrifuging, wherein the acid sludge was removed, and the second centrifuging, wherein the polymerized sulphonic products were removed. In the chart the acidity of the oil is expressed by the pounds of NaOH required to neutralize one barrel of oil. From the chart it is seen that a noticeable reduction in acidity occurred with a reaction time of 10 minutes, but that for optimum results a reaction time of at least 45 minutes should be used.

In the foregoing description the term "polymerization" has been used to specify the reaction occurring among the oil-soluble sulphonation products following the initial removal of acid sludge. As the reaction is not well understood, the term is used in a broad sense to denote the formation of oil-insoluble bodies by a reaction involving unstable oil-soluble sulphonation products. It is not intended to limit the term to certain specific chemical reactions to which the term is sometimes applied in the art.

While the invention is not restricted to any specific lubricating oil stocks undergoing treatment with sulphuric acid, it is particularly adapted to the sulphuric acid treatment of lubricating stocks derived from California crudes and like oils which contain relatively large amounts of materials readily attacked by sulphuric acid. As used herein the term "lubricating oil" is intended to refer to viscous oils having a viscosity in excess of 50 seconds S. U. @ 100° F. as contrasted with naphthas and kerosenes. Embraced in the term, as so used, are viscous oils primarily intended for use as transformer dielectrics, insecticidal sprays, and the like.

Following is an example of the practice of the invention in combination with commercial sulphuric acid refining:

A lube distillate derived from California Coalinga crude oil and having a Saybolt Universal viscosity of 62 seconds at 210° F. was charged at the rate of 1000 barrels per day to a continuous acid treating plant wherein the oil, heated to a temperature of about 140° F., was contacted in a centrifugal pump with 98% sulphuric acid at the rate of 60 pounds of acid per barrel of oil. The mixture of acid and oil then passed to a treating tank wherein an average time of treatment of 15 minutes was maintained, after which the acid sludge was removed from the oil by a battery of four centrifuges operating in parallel. The oil, freed from acid sludge, was then passed through a time-tank wherein the average time of residence was 45 minutes, permitting the formation of polymers of the more unstable oil-soluble sulfonation products. From the time-tank the oil was charged to a battery of two parallel centrifuges similar to those used for the acid-sludge separation. The acid oil was then charged to a 1000 barrel agitator and contacted 2 to 3 hours with an excess of 4° Bé. caustic soda solution, after which the mixture was allowed to settle, the spent caustic containing sulphonic soaps was withdrawn, and the neutralized oil was passed to storage. Crude sulphonic soaps were recovered from the spent caustic by salting out with strong caustic soda solution. The following table gives data obtained in this run compared with data for a similar run made in the same apparatus by the conventional procedure omitting the time-tank and second centrifuges:

| | Process according to invention | Conventional procedure |
|---|---|---|
| Lube distillate charged (bbl./day) | 1,000 | 1,000 |
| Acid treated oil from first centrifuges (bbl./day) | 740 | 740 |
| Acid treated oil from second centrifuges (bbl./day) | 728 | |
| Oil charged to agitator (bbl.) | 728 | 740 |
| 4° Bé. caustic soda used (lbs. NaOH) | 500 | 940 |
| Theoretical caustic soda required (lbs.) | 460 | 890 |
| Neutral oil recovered (bbl.) | 710 | 703 |
| Crude sulphonic soaps (bbl.) | 18 | 37 |
| Oil in crude sulphonic soaps (%) | 50 | 75 |
| $Fe_2O_3$ in crude sulphonic soaps (%) | .002 | .05 |
| Time required for spent caustic to settle from neutralized oil (hr.) | 6 | 18 |

We claim:

1. The method of acid treating oil which comprises: contacting a viscous hydrocarbon oil with concentrated sulphuric acid for a time and at a temperature sufficient to cause the acid to react with unstable constituents of the oil to form oil-soluble sulphonation products and oil-insoluble acid sludge, centrifuging the contacted oil to remove said sludge, maintaining the sludge free oil without further treatment for a period of time between ten minutes and about one hour sufficient to cause unstable oil-soluble constituents to polymerize and form oil-insoluble bodies, centrifuging said bodies from said oil, then contacting the oil with excess alkali to absorb contained acidic bodies and removing the contacted alkali from the oil.

2. The method of claim 1 wherein said period of time is at least about 45 minutes.

3. The method of claim 1 wherein said alkali is aqueous caustic soda.

4. In an oil treating process wherein a stream of viscous hydrocarbon oil is first contacted with concentrated sulphuric acid forming oil-soluble sulphonation products and oil-insoluble acid sludge and the stream of oil is then subjected to a centrifuging step to remove the acid sludge and wherein the sludge-free oil is later contacted with an alkali to absorb and remove oil-soluble acidic substances, the combination of steps which comprises: subsequent to said centrifuging step and prior to contacting with alkali, providing a time interval between ten minutes and about one hour sufficient for unstable oil-soluble sulphonation products in said oil stream to polymerize and form oil-insoluble bodies and then centrifuging said bodies from said stream.

5. In an oil treating process wherein a stream of viscous hydrocarbon oil is continuously contacted with concentrated sulphuric acid forming oil-soluble sulphonation products and oil-insoluble acid sludge and said sludge is continuously and mechanically removed from the oil and wherein the sludge-free oil is later contacted with an alkali to absorb and remove oil-soluble acidic substances, the combination of steps which comprises: subjecting the acid treated oil to a first centrifuging step to remove acid sludge, then, after a period of time between ten minutes and about one hour sufficient for unstable oil-soluble sulphonation products in said oil to polymerize and form oil-insoluble bodies but prior to contacting with alkali, subjecting the oil to a second centrifuging step to remove oil-insoluble bodies so formed.

6. In combination with an oil treating process wherein a stream of viscous hydrocarbon oil is contacted with concentrated sulphuric acid to cause the acid to react with constituents of the oil to form oil-soluble sulphonation products and oil-insoluble acid sludge, and wherein the acid sludge is thereafter centrifuged from the oil, the method of removing unstable oil-soluble sulphonation products which comprises: causing the sludge free oil to remain in acid condition for a period between ten minutes and about one hour sufficient for unstable oil-soluble sulphonation products to polymerize forming oil-insoluble bodies, then centrifuging said bodies from said oil.

7. The process of removing unstable compounds from oil which comprises: causing a sulphuric acid treated viscous hydrocarbon oil containing unstable oil-soluble sulphonation products to remain in the absence of acid sludge for a substantial period of time in the order of one hour sufficient for said products to polymerize and form bodies insoluble in the oil, then centrifuging said oil to remove said bodies.

8. The process of removing unstable compounds from oil which comprises: causing a sulphuric acid treated viscous hydrocarbon oil containing unstable oil-soluble sulphonation products to remain in the absence of acid sludge for a substantial period of time in the order of one hour sufficient for said products to polymerize and form bodies insoluble in the oil, then mechanically removing said bodies from said oil.

9. The method of acid treating oil which comprises: contacting a viscous hydrocarbon oil with concentrated sulphuric acid for a time and at a temperature sufficient to cause the acid to react with unstable constituents of the oil to form oil-soluble sulphonation products and oil-insoluble acid sludge, immediately separating substantially all the sludge from the oil, maintaining the sludge free oil without further treatment for a period of time between ten minutes and about one hour sufficient to cause unstable oil-soluble constituents to polymerize and form oil-insoluble bodies, centrifuging said bodies from said oil, then contacting the oil with excess alkali to absorb contained acidic bodies and removing the contacted alkali from the oil.

10. The method of acid treating oil which comprises: contacting a viscous hydrocarbon oil with concentrated sulphuric acid for a time and at a temperature sufficient to cause the acid to react with unstable constituents of the oil to form oil-soluble sulphonation products and oil-insoluble acid sludge, centrifuging the contacted oil to remove said sludge, maintaining the sludge free oil without further treatment for a period of time between ten minutes and about one hour sufficient to cause unstable oil-soluble constituents to polymerize and form oil-insoluble bodies, immediately separating substantially all said bodies from said oil, then contacting the oil with excess alkali to absorb contained acidic bodies and removing the contacted alkali from the oil.

11. The method of acid treating oil which comprises: contacting a viscous hydrocarbon oil with concentrated sulphuric acid for a time and at a temperature sufficient to cause the acid to react with unstable constituents of the oil to form oil-soluble sulphonation products and oil-insoluble acid sludge, immediately separating substantially all the sludge from the oil, maintaining the sludge free oil without further treatment for a period of time between ten minutes and about one hour sufficient to cause unstable oil-soluble constituents to polymerize and form oil-insoluble bodies, immediately separating substantially all said bodies from said oil, then contacting the oil with excess alkali to absorb contained acidic bodies and removing the contacted alkali from the oil.

BENJAMIN G. JONES.
LESLIE H. SHARP.